US008429268B2

(12) United States Patent
Riley et al.

(10) Patent No.: US 8,429,268 B2
(45) Date of Patent: Apr. 23, 2013

(54) MECHANISM FOR DETECTING AND REPORTING TRAFFIC/SERVICE TO A PCRF

(75) Inventors: Yusun Kim Riley, Marlborough, MA (US); Uri Baniel, Buffalo Grove, IL (US); Mark Delsesto, Hudson, NH (US)

(73) Assignee: Camiant, Inc., Marlborough, MA (US)

( * ) Notice: Subject to any disclaimer, the term of this patent is extended or adjusted under 35 U.S.C. 154(b) by 0 days.

(21) Appl. No.: 12/621,190

(22) Filed: Nov. 18, 2009

(65) Prior Publication Data

US 2011/0022702 A1 Jan. 27, 2011

Related U.S. Application Data

(60) Provisional application No. 61/228,278, filed on Jul. 24, 2009.

(51) Int. Cl.
*G06F 15/173* (2006.01)
(52) U.S. Cl.
USPC ........... 709/224; 709/222; 709/223; 709/227; 709/228; 370/229; 370/235; 370/241
(58) Field of Classification Search .......... 709/222–228; 370/229–241
See application file for complete search history.

(56) References Cited

U.S. PATENT DOCUMENTS

| | | | |
|---|---|---|---|
| 6,141,686 A * | 10/2000 | Jackowski et al. | 709/224 |
| 6,651,101 B1 * | 11/2003 | Gai et al. | 709/224 |
| 6,661,780 B2 | 12/2003 | Li | |
| 6,880,005 B1 | 4/2005 | Bell et al. | |
| 7,209,962 B2 * | 4/2007 | Boden | 709/223 |
| 7,581,249 B2 * | 8/2009 | Bussiere et al. | 726/22 |
| 7,719,966 B2 * | 5/2010 | Luft et al. | 370/229 |

(Continued)

FOREIGN PATENT DOCUMENTS

| EP | 2 045 974 A1 | 4/2009 |
|---|---|---|
| KR | 10-2006-0028042 | 3/2006 |

(Continued)

OTHER PUBLICATIONS

Notification of Transmittal of the International Search Report and the Written Opinion of the International Searching Authority, or the Declaration for International Application No. PCT/US2011/027427 (Nov. 15, 2011).

(Continued)

*Primary Examiner* — Wing F Chan
*Assistant Examiner* — Razu Miah
(74) *Attorney, Agent, or Firm* — Jenkins, Wilson, Taylor & Hunt, P.A.

(57) ABSTRACT

A method implemented by a policy server operating on a network to which is connected a device that performs a data packet inspection function, the method involving: sending a first message over the network from the policy server to the device, the first message instructing the device to detect an occurrence of a particular network traffic or service taking place over a connection on the network and to send a notification to the policy server upon detecting the occurrence of that particular network traffic or service; at the policy server receiving a notification from the device that the device has detected the occurrence of that particular network traffic or service; and in response to receiving the notification, sending a second message over the network from the policy server to a network component, the second message containing information associated with the notification.

16 Claims, 2 Drawing Sheets

U.S. PATENT DOCUMENTS

| | | | |
|---|---|---|---|
| 8,146,133 B2* | 3/2012 | Moon et al. | 726/1 |
| 2002/0143914 A1* | 10/2002 | Cihula | 709/223 |
| 2003/0208523 A1* | 11/2003 | Gopalan et al. | 709/201 |
| 2005/0088977 A1 | 4/2005 | Roch et al. | |
| 2006/0013191 A1 | 1/2006 | Kavanagh | |
| 2006/0233101 A1* | 10/2006 | Luft et al. | 370/229 |
| 2007/0004393 A1 | 1/2007 | Forsberg et al. | |
| 2007/0066286 A1 | 3/2007 | Hurtta | |
| 2007/0159976 A1 | 7/2007 | Dekeyzer et al. | |
| 2007/0220251 A1* | 9/2007 | Rosenberg et al. | 713/156 |
| 2007/0242692 A1 | 10/2007 | Limb et al. | |
| 2007/0286117 A1* | 12/2007 | Balasubramanian et al. | 370/328 |
| 2008/0046963 A1 | 2/2008 | Grayson et al. | |
| 2008/0076388 A1* | 3/2008 | Nochimowski et al. | 455/411 |
| 2008/0137541 A1* | 6/2008 | Agarwal et al. | 370/241 |
| 2008/0201772 A1* | 8/2008 | Mondaeev et al. | 726/13 |
| 2008/0232376 A1 | 9/2008 | Huang et al. | |
| 2008/0276305 A1* | 11/2008 | Chan et al. | 726/5 |
| 2008/0313708 A1* | 12/2008 | Khan et al. | 726/3 |
| 2009/0089418 A1* | 4/2009 | Saha et al. | 709/224 |
| 2009/0177650 A1 | 7/2009 | Petersson et al. | |
| 2009/0196225 A1* | 8/2009 | Avila Gonzalez et al. | 370/328 |
| 2009/0227231 A1 | 9/2009 | Hu et al. | |
| 2009/0228956 A1* | 9/2009 | He et al. | 726/1 |
| 2009/0285225 A1* | 11/2009 | Dahod | 370/401 |
| 2009/0307028 A1 | 12/2009 | Eldon et al. | |
| 2009/0323536 A1* | 12/2009 | Liu et al. | 370/241 |
| 2010/0040047 A1 | 2/2010 | Zamora et al. | |
| 2010/0121960 A1 | 5/2010 | Baniel et al. | |
| 2010/0185488 A1 | 7/2010 | Hogan et al. | |
| 2010/0235877 A1* | 9/2010 | Hu et al. | 726/1 |
| 2011/0041182 A1 | 2/2011 | Stenfelt | |
| 2011/0167471 A1 | 7/2011 | Riley et al. | |
| 2011/0170412 A1* | 7/2011 | Ramadas et al. | 370/235 |
| 2011/0202653 A1 | 8/2011 | Riley et al. | |
| 2011/0219426 A1 | 9/2011 | Kim et al. | |
| 2011/0225280 A1 | 9/2011 | Delsesto et al. | |
| 2011/0225306 A1 | 9/2011 | Delsesto et al. | |
| 2011/0225309 A1 | 9/2011 | Riley et al. | |
| 2012/0084425 A1 | 4/2012 | Riley et al. | |
| 2012/0131165 A1* | 5/2012 | Baniel et al. | 709/223 |

FOREIGN PATENT DOCUMENTS

| | | |
|---|---|---|
| KR | 10-2009-0027861 | 3/2009 |
| WO | WO 2008/000287 A1 | 1/2008 |
| WO | WO 2008/114217 A1 | 9/2008 |
| WO | WO 2009/149341 A2 | 12/2009 |
| WO | WO 2010/086013 A1 | 8/2010 |
| WO | WO 2011/082036 A2 | 7/2011 |
| WO | WO 2011/100684 A2 | 8/2011 |
| WO | WO 2011/109821 A2 | 9/2011 |
| WO | WO 2011/115991 A2 | 9/2011 |

OTHER PUBLICATIONS

Notification of Transmittal of the International Search Report and the Written Opinion of the International Searching Authority, or the Declaration for International Application No. PCT/US2011/028520 (Oct. 31, 2011).

Notification of Transmittal of the International Search Report and the Written Opinion of the International Searching Authority, or the Declaration for International Application No. PCT/US2011/024753 (Oct. 28, 2011).

Notification of Transmittal of the International Search Report and the Written Opinion of the International Searching Authority, or the Declaration for International Patent Application No. PCT/US2010/061589 (Sep. 26, 2011).

Commonly-assigned, co-pending U.S. Appl. No. 13/225,390 for "Method and System for Providing Mobility Management in Network", (Unpublished, filed on Sep. 2, 2011).

Non-Final Official Action for U.S. Appl. No. 12/479,179 (Aug. 2, 2011).

Commonly-assigned, co-pending U.S. Appl. No. 13/157,052 for "Methods, Systems, and Computer Readable Media for Providing Nested Policy Configuration in a Communications Network", (Unpublished, filed on Jun. 9, 2011).

Notification of Transmittal of the International Search Report and the Written Opinion of the International Searching Authority, or the Declaration for International Application No. PCT/US2010/043258 (Feb. 28, 2011).

Restriction Requirement for U.S. Appl. No. 12/479,179 (Feb. 8, 2011).

"3rd Generation Partnership Project; Technical Specification Group Core Network and Terminals; Policy and Charging Control over Rx reference point (Release 9)," 3GPP TS 29.214, V9.3.0, pp. 1-45 (Mar. 2010).

"Universal Mobile Telecommunications System (UMTS); LTE; Policy and charging control over Rx reference point (3GPP TS 29.214 version 9.2.0 Release 9)," ETSI TS 129 214, V9.2.0 (Jan. 2010).

"Universal Mobile Telecommunications System (UMTS); LTE; Policy and charging control over Gx reference point (3GPP TS 29.212 version 9.1.0 Release 9)," ETSI TS 129 212, V9.1.0 (Jan. 2010).

Notification of Transmittal of the International Search Report and the Written Opinion of the International Searching Authority, or the Declaration for International Application No. PCT/US2009/046395 (Dec. 28, 2009).

3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).

"Chapter 1: Overview of GPRS and UMTS," Cisco GGSN release 9.0 Configuration Guide, Cisco IOS Release 12.4(22)Ye, pp. 1-1-1-16 (Aug. 4, 2009).

"Introduction to Diameter," Wikipedia, pp. 1-12 (Downloaded from the Internet on May 15, 2009).

"Diameter Credit-Control Application," Wikipedia, pp. 1-7 (Downloaded from the Internet on May 13, 2009).

"Diameter (Protocol)," Wikipedia, pp. 1-8 (Downloaded from the Internet on May 13, 2009).

"File: GPRS Core Structure.phg," Wikipedia, pp. 1-3 (Downloaded from the Internet on May 13, 2009).

"GPRS Core Network," Wikipedia, pp. 1-6 (Downloaded from the Internet on May 13, 2009).

"GPRS Network Architecture," DenMasBroto, pp. 1-2 (Downloaded from the Internet on May 13, 2009) (May 28, 2008).

Agilent Technologies, "Understanding DSLAM and BRAS Access Devices," White Paper, pp. 1-15 (2006).

Hakala et al., "Diameter Credit-Control Application," Network Working Group RFC 4006, pp. 1-114 (Aug. 2005).

Zhou et al., "Prophet Address Allocation for Large Scale MANETs," Ad Hoc Networks, vol. 1, Issue 4, pp. 423-434 (Nov. 2003).

Calhoun et al., "Diameter Base Protocol," RFC 3588, pp. 1-147 (Sep. 2003).

Ponnappan et al., "A Policy Based QoS Management System for the IntServ/DiffServ Based Internet," Policies for Distributed Systems and Networks, pp. 159-168 (2002).

Non-Final Official Action for U.S. Appl. No. 13/225,390 (May 14, 2012).

Communication of European publication number and Information on the application of Article 67(3) EPC for European Application No. 10803020.6 (May 4, 2012).

Final Official Action for U.S. Appl. No. 12/479,179 (Apr. 10, 2012).

3rd Generation Partnership Project, "Technical Specification Group Core Network and Terminals; Policy and Charging Control over Gx Reference Point," 3GPP TS 29.212, V8.0.0, Release 8 (May 2008).

Notice of Allowance and Fee(s) Due for U.S. Appl. No. 13/225,390, pp. 1-19 (Oct. 9, 2012).

Non-Final Official Action for U.S. Appl. No. 12/479,179, pp. 1-13 (Sep. 13, 2012).

European Search Report for European Patent Application No. EP 09 75 9499, pp. 1-6 (Sep. 12, 2012).

Non-Final Official Action U.S. Appl. No. 12/973,186, pp. 1-22 (Aug. 24, 2012).

Applicant-Initiated Interview Summary for U.S. Appl. No. 13/225,390, pp. 1-13 (Aug. 13, 2012).

Non-Final Official Action for U.S. Appl. No. 13/042,294, pp. 1-12 (Jun. 20, 2012).

* cited by examiner

MECHANISM FOR DETECTING AND REPORTING TRAFFIC/SERVICE TO A PCRF

This application claims the benefit of U.S. Provisional Application No. 61/228,278, filed Jul. 24, 2009, the contents of which are incorporated herein by reference.

TECHNICAL FIELD

This invention generally relates to communication networks and, more particularly, to detecting and reporting traffic and/or services in communication networks.

SUMMARY OF THE INVENTION

There are various aspects of the embodiments described herein that are new. These include, for example: instructing the Deep Packet Inspection (DPI) module to report to the PCRF (Policy and Charging Rules Function) the occurrence of a certain traffic or service type over a connection event as contrasted with taking some enforcement action on its own; the ability of the PCRF to take an action upon such notification as well as notify an Application Function (AF) about such an event, which could otherwise go unnoticed; the ability of the AF to be notified about such an event and take an action; and the ability for the PCRF to tell the DPI which applications it wants triggers for per subscriber. Without the mechanisms described herein, the DPI would have to be separately provisioned and there are no good ways to do that on a per application or per subscriber basis.

In general, in one aspect, the invention features a method implemented by a policy server operating on a network to which is connected a device that performs a data packet inspection function. The method involves: sending a first message over the network from the policy server to the device, the first message instructing the device to detect an occurrence of a particular network traffic or service taking place over a connection on the network and to send a notification to the policy server upon detecting the occurrence of that particular network traffic or service; at the policy server receiving a notification from the device that the device has detected the occurrence of that particular network traffic or service; and in response to receiving that notification, sending a second message over the network from the policy server to a network component, the second message containing information associated with said notification.

Other embodiments include one or more of the following features. The network component is the device. The second message instructs the network component to apply a new rule to the particular network traffic or service taking place over the connection. The second message contains the new rule or a pointer to the new rule. The device is a gateway which also implements the data packet inspection function. The component is a computer system running an application function. The second message reports the detected occurrence of the particular traffic or service to the network component. The second component logs information received from the policy server via the second message. The policy server implements a policy and charging rules function (PCRF). The method further involves receiving a notification that a particular subscriber has established the connection over the network and wherein sending the first message over the network from the policy server to the device is in response to receiving the notification that the particular subscriber has established the connection over the network.

The details of one or more embodiments of the invention are set forth in the accompanying drawings and the description below. Other features, objects, and advantages of the invention will be apparent from the description and drawings, and from the claims.

DETAILED DESCRIPTION

An underlying motivation for the embodiments described herein is providing a mechanism to enable a network operator to be more aware of what the communication pipes that are implemented by the network are being used for.

Figure 1:
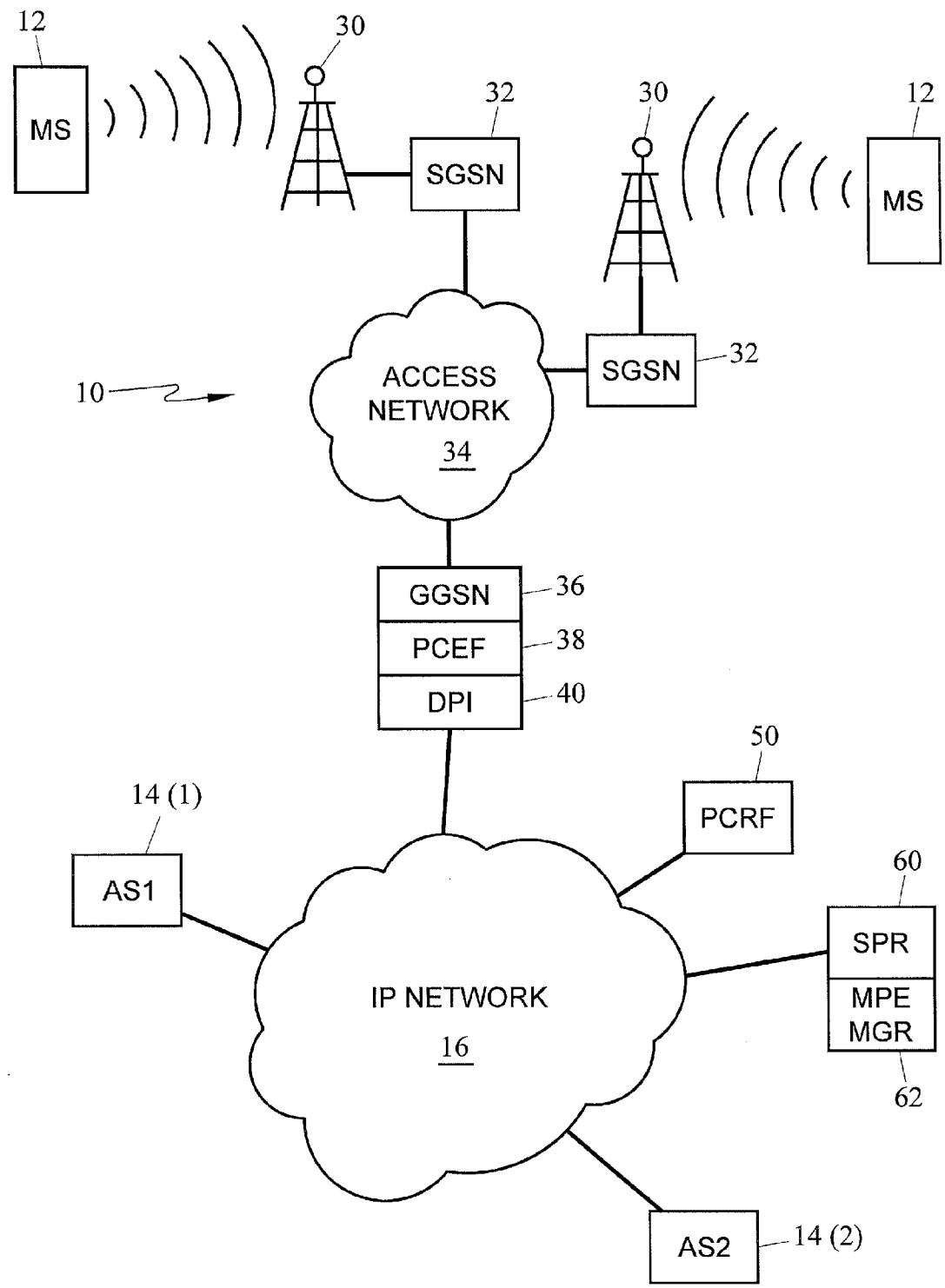
FIG. 1 is a high level diagram of a mobile network.

FIG. 1 shows a representative network that will be used to describe in greater detail the ideas presented herein. It includes a mobile network 10 in which mobile stations (MS) 12 communicate or connect with each other and/or with application servers 14 located elsewhere on a core network 16, e.g. an IP network.

Mobile network 10 includes receiving towers 30 with associated base stations and base station controllers (not shown) connected to SGSNs 32. SGSNs 32 are, in turn, connected via an core access network 34 to one or more GGSNs (Gateway GPRS Support Nodes) 36. All traffic from the SGSNs goes through the GGSNs. The GGSN supports the use of GPRS (General Packet Radio Service) in a GSM (Global Service for Mobile communications) network. GPRS is a packet based communication service which allows packets to be sent and received across a mobile telephone network. And GSM is a popular standard for mobile phones throughout the world. It is responsible for interfacing between the GPRS network and an external packet switched network, such as the Internet or X.25 networks.

From the point of view of the external networks, the GGSN is like a gateway or router to a sub-network. When the GGSN receives data addressed to a specific user, it checks if the user is active. If the user is active, the GGSN forwards the data to the SGSN serving that mobile user.

The GGSN enables the mobility of the user device. It has a number of functions but the ones that are particularly relevant to the embodiments described herein include: storing the SGSN address of the user, storing the user's profile, performing authentication and charging functions, and QoS and PDP context-management.

The SGSN is a Serving GPRS Support Node. It is responsible for the delivery of data packets from and to the mobile stations within its geographical area. Its tasks include packet routing and transfer, mobility management, and authentication and charging functions, to name a few.

The architecture implements a Policy and Charging Control (PCC) architecture which determines and enforces dynamic QoS and charging policies to all the network infrastructure elements involved in providing a specific requested service. It includes a Policy and Charging Rules Function (PCRF) and a Policy and Charging Enforcement Function (PCEF). The PCRF is the node or module for determining the policy rules and performing a provisioning function. For example, a set of policy rules can be activated to verify access pet mission, checking and debiting credit balance etc., all in real-time. The PCRF enforces these policy rules through its interaction with the PCEF.

In the described embodiment, within GGSN 36, there is a PCEF (policy charging enforcement function) 38 and a DPI (Deep Packet Inspection) function 40. As noted above, PCEF 38 enforces the rules for the sessions handled by GGSN 36. And DPI 40 enables GGSN 36 to snoop the packets for details about various layers of the data packet.

In general, DPI 40 includes functionality enabling it to perform traffic type and service flow detection. DPIs comes in different types. They can be standalone, passive devices that might simply sit somewhere on the network and "listen" to traffic that goes by, e.g. email traffic, Skype traffic, etc. In that case, the DPI can be almost anywhere; but normally it is part of the operator's network infrastructure, e.g. close to or part of border gateway. They can participate moderately by actively listening and also enforcing or applying some routing or Quality of Service (QoS) or gating (e.g. blocking or enabling traffic) functionality. Or they can participate strongly by being integrated into and forming a part of the border gateway device (e.g. GPSN) thereby being located at the point of enforcement of policies for the network. In the described embodiment, DPI 40 is integrated into PCEF 38 and effectively extends functionality of the PCEF.

Located elsewhere on the core network is a PCRF 50. PCRF 50 is a policy server that among its many functions controls who is allowed onto the network, the QoS and bandwidth that is applied to that user, and the charging rules for usage of the network. This aspect of its operation is implemented by PCRF 50. In general, PCRF 50 makes the policy decisions and is responsible for sending commands to another element that sits in the traffic path and that enforces those policy decisions. What those paths are and what the other elements are depends on the type of network. In the case of the wireless network of the described embodiment, the other element is the PCEF in the GGSN, which then implements those policy decisions. In short, PCEF 38 and PCRF 50 are peers that communicate with each other to implement bandwidth, QoS, and charging policies.

Access requests by subscribers or users go to PCRF 50 which evaluates these requests and either approves or denies them, depending on availability of network resources and policies or rules that are available to PCRF 50. If the request is approved, PCRF 50 instructs the appropriate gateway device (e.g. GGSN) 36 to reserve bandwidth and QoS for the session. Its extended functionality includes keeping track of and monitoring the state of the network (what is happening on the network, the state of the sessions, etc.) and making policy decisions based on the state of the network. In general, gateways are not permitted to service traffic without authorization from PCRF 52.

There is also a Subscription Profile Repository (SPR) 60 which stores user-related information and user profiles for use by PCRF 50. More specifically, SPR database has entitlements for users, user profiles, bandwidths that should be applied, charging schemes, etc. In the described embodiment, it is part of an manager 62 that serves to configure all kinds of policy rules that go into the PCRF. However, SPR 60 could be separate from manager 62.

There are also application servers 14(1) and 14(2) (AS1 and AS2) located elsewhere on the IP network. There are many different types of application servers. For example, they Yahoo web servers, file upload servers, video servers, Xbox servers, and VoIP servers, just to name a few.

The PCEF/DPI detects a particular traffic/service and notifies the PCRF. The PCRF then instructs PCEF/DPI accordingly (e.g. QoS upgrade) as well as notifies other interested or subscribed nodes (e.g. AFs).

The monitoring and notification role played by the PCEF/DPI is particularly useful in networks for which there is no server controlling the communication. For example, in the case of VoIP calls, there is a server that handles and manages those calls. The ISP might want to know about VoIP calls so as to apply special charging rates or special behaviors to those calls. If the VoIP server is under the control of the ISP, then detection and enforcement is relatively straight forward. But in networks carrying communications that do not involve a server monitoring how the data pipe is being used can present more of a challenge. One example is communications in which data packets are sent in point-to-point communications (e.g. Skype calls). The ISP typically does not have a server that manages those types of calls and is thus not able to detect their presence on the network. So, one can readily see in that example that the ISP may not know precisely how its network and data pipes are being used. This unawareness is a barrier to ISP being able to provide the level of service that is appropriate to the usage and it is a barrier to the ISP being able to apply charging policies that are appropriate to the usage to which the subscriber is putting the network. The functionality described herein addresses that shortcoming.

Of course, the DPI needs to be programmed to detect Skype calls, or whatever other types of traffic that one wants it to detect. The DPI can be programmed to detect any type of message that might pass over the network so long as the details of the protocol for that message are known to the DPI. The IP packet (or more generally, the data packet) carries all of the information about the communication that is taking place. The relevant parts of that information just need to be extracted to identify what type of traffic or service the packet is part of.

Figure 2:
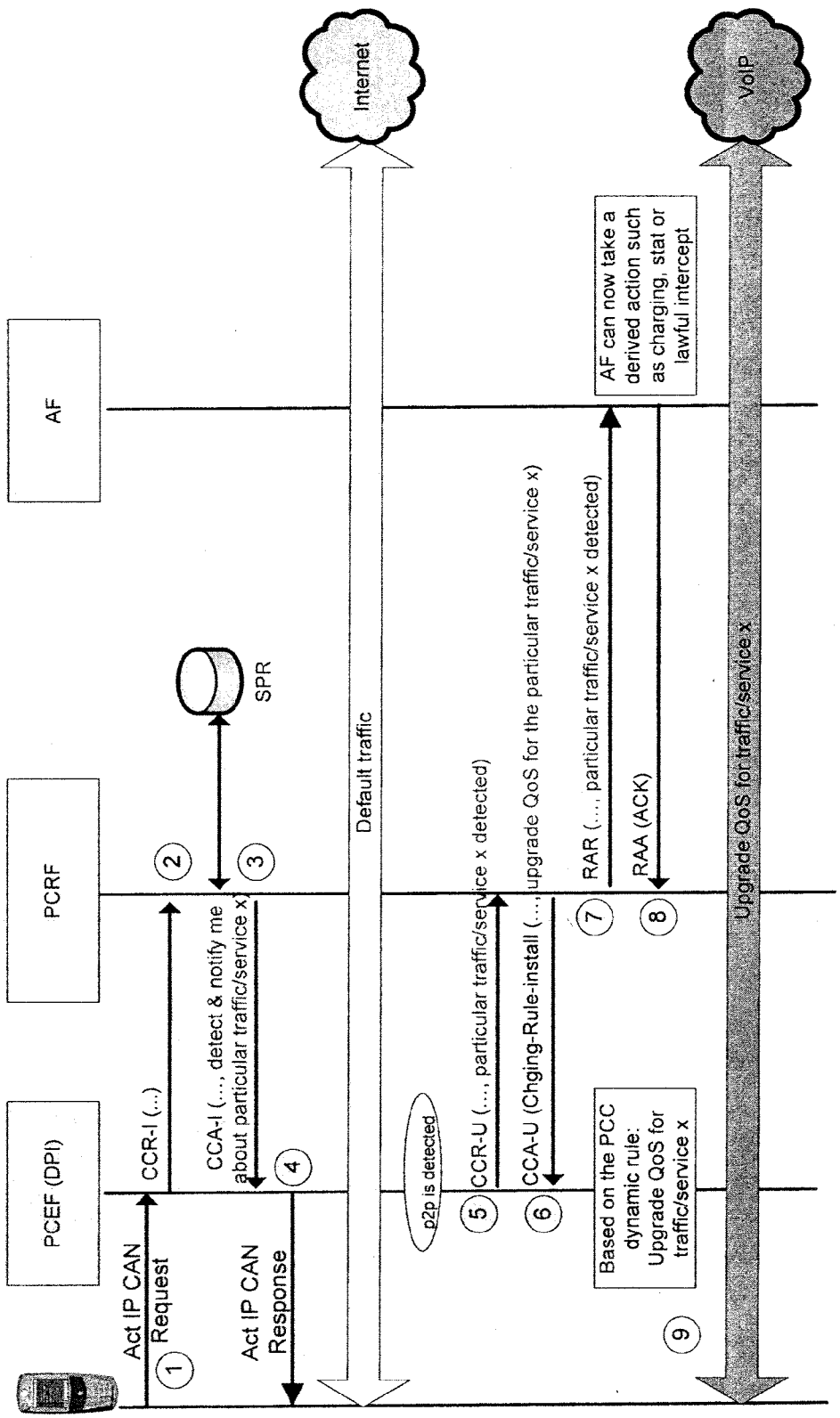
FIG. 2 is a ladder diagram illustrating message exchanges in the mobile network of FIG. 1.

FIG. 2 presents a ladder diagram which shows an exchange of messages that implements the DPI notification function described herein.

The exemplary exchange begins with a cellular device (e.g. cell phone) initiating a normal attach process by sending an appropriate request message to the gateway containing PCEF.

When a subscriber comes online, the subscriber's mobile station sends a session request to the GGSN. In the described embodiment, this request is in the form of an "Act IP CAN Request" which solicits IP context (i.e., packet session attributes). That request indicates the location of the subscriber, which in this case is known by virtue of the cell tower to which the subscriber is connected.

As a result of processing that session request, the PCEF within the GGSN sends an inquiry to the PCRF. In the described embodiment, the PCEF/DPI and PCRF communicate with each other by using the Diameter protocol, though any one of the available alternative protocols could be used instead. So, in this case, the particular message that the PCEF sends to the PCRF is a CCR-I (Credit-Control-Request Initial) message. This message notifies the PCRF that a new session is being requested by the subscriber, who is identified in the command; it seeks authorization for setting up a session for that subscriber; and it seeks to retrieve the policy rules package that is relevant to the particular GGSN and the particular user/subscriber identified in the message. For example, it seeks bandwidth, QoS, and charging policies that are to be applied to the new session for that subscriber.

In response to receiving the CCR-I message, the PCRF retrieves from the SPR the user profile. The PCRF then passes the user profile to the PCEF within the GGSN using a CCA-I (Credit-Control-Answer) message. And the PCEF stores the profile locally.

If the DPI is part of the PCEF, as it is in this embodiment, the CCA-I message also contains instructions for the DPI to listen to the connection that is being set up and notify the PCRF if service or traffic of a particular type (e.g. Skype call, gaming traffic, etc.) is detected over that connection. If the DPI is not part of the PCEF but is located elsewhere, the PCRF knows its location and sends a separate CCA-I message to the DPI with the relevant instructions.

In this described scenario, the rules are carried by the message that is sent to the PCEF/DPI. Alternatively, the various rules could be stored so as to be accessible to the PCEF and the message simply contains a pointer to the particular rule that is to be applied or implemented.

Assuming the requested session is authorized, the PCEF sets up the session with the appropriate charging and QoS attributes and sends a response (in the form of an Act IP CAN response) to the subscriber's device. This acknowledges that a connection was made. If no connection was made, the subscriber's device generates an error message indicating that fact to the subscriber.

Up to this point no traffic has yet taken place. The steps that were implemented simply involve letting the system know that user has turned on cell phone and acknowledging to the user that the system is aware of the user's cell phone being active. At some later time, the user may use the connection for communications over the network.

Assume, for this example, the DPI was instructed to notify on the basis of detecting a particular point-to-point communication over the established connection. Normally this kind of traffic would go under the radar of the conventional equipment employed by the operator of the network and would not be detected. For example, PC to PC communications often take place without any other devices or servers involved in that communication other than the network infrastructure.

Examples other than point-to-point communications include two common type of traffic, namely, video streaming and gaming both of which happen to be examples of client-server communications.

Upon detecting that point-to-point communication, the DPI sends a CCR-U (Credit-Control-Request-Update) message to PCRF notifying it that the particular traffic/service was detected.

In response to receiving that notification, the PCRF takes whatever action is desired or appropriate. For example, it might be desirable to upgrade the QoS for that connection when it is being used for that particular type of traffic; or it might be desirable to install different charging rules. The PCRF sends the corresponding instructions to the PCEF using a CCA-U message. And the PCEF responds by having the gateway implement the new rules.

For example, the PCRF might instruct the DPI to detect Skype calls and notify the PCRF of such calls which the PCRF then might want to instruct the PCEF to either block or notify the caller that an upgrade in the service package would be appropriate.

The PCRF may also (or in the alternative) notify an application function (AF) located elsewhere on the network. For example, the PCRF could notify that application that the DPI has reported detecting a particular event. The AF can then take whatever action is appropriate. The AF could simply be maintaining a log of events which would enable the operator or another entity to learn about system and user statistics. Based on that, it can provide details about how system is being used for purposes of planning and network development.

These last described steps involving sending messages to the PCEF and the AF can, of course, take place in parallel and need not be performed sequentially as shown in FIG. 2.

One example of an AF that might be used is a logging function that keeps track of the VoIP traffic for different subscribers. This might be for the purpose of implementing more fine-tuned billing mechanisms for heavy VoIP users instead of simply applying a flat rate structure. Another application function might be to perform a lawful intercept which involves simply monitoring a logging traffic and messages from certain categories of users or certain subscribers.

The principles and methods described herein do not only apply only to mobile cell phone networks of the type described; they also apply to a wide range of other network types such as cable networks and fixed networks among which a Digital Subscriber Line (DSL) network is an example. In the various other networks in which these ideas might be implemented there is typically a special router (e.g. border gateway) which is similar to the GGSN and into which the PCEF functionality can be integrated. In the cable network, that border gateway is a CMTS and in the DSL network, it is a B-RAS. The border gateway finds the other routers in the network and it knows to which routers it should send traffic based on the destination of that traffic.

It should also be understood that the functionality described herein (such as the PCRF, the PCEF, the DPI, and the manager) can be implemented by software or code running on a processor system. Such a processor system would typically include computer readable medium storing the software or code for the relevant functionality and one or more processors on which that software or code is executed to implement the relevant functionality.

Other embodiments are within the following claims.

What is claimed is:

1. A method implemented by a policy server operating on a network to which is connected a device that performs a data packet inspection function, said method comprising:

sending a first message over the network from the policy server to the device, said first message instructing the device to detect an occurrence of a particular network traffic or service taking place over a connection on the network and to send a notification to the policy server upon detecting the occurrence of said particular network traffic or service, wherein the device comprises a gateway general packet radio service (GPRS) support node that implements a deep packet inspection (DPI) function;

at the policy server receiving a notification from the device that the device has detected the occurrence of said particular network traffic or service; and in response to receiving said notification, sending a second message over the network from the policy server to a network component, said second message containing information associated with said notification, said second message instructing the network component to apply a new rule to said particular network traffic or service taking place over the connection, and said second message containing at least one of bandwidth, quality of service (QoS), and charging policy instructions for said network component to implement with respect to said particular network traffic or service for said connection.

2. The method of claim 1, wherein the network component is said device.

3. The method of claim 1, wherein the second message contains the new rule.

4. The method of claim 1, wherein the second message contains a pointer to the new rule.

5. The method of claim 1, wherein the device is a gateway which also implements the data packet inspection function.

6. The method of claim 1, wherein the component is a computer system running an application function.

7. The method of claim 6, wherein the second message reports the detected occurrence of said particular traffic or service to the network component.

8. The method of claim 6, wherein the network component logs information received from the policy server via the second message.

9. The method of claim 1, wherein the policy server implements a policy and charging rules function (PCRF).

10. The method of claim 1, further comprising receiving a notification that a particular subscriber has established the connection over the network and wherein sending the first message over the network from the policy server to the device is in response to receiving said notification that said particular subscriber has established the connection over the network.

11. A system for detecting and reporting network traffic, the system comprising:
- a policy server for sending a first message over a network from the policy server to a device that performs a data packet inspection function, said first message including instructions for detecting an occurrence of a particular network traffic or service taking place over a connection on the network and to send a notification to the policy server upon detecting the occurrence of said particular network traffic or service, wherein the device comprises a gateway general packet radio service (GPRS) support node that implements a deep packet inspection (DPI) function; and
- a device for receiving the instructions, for detecting the particular traffic or service, and for sending a notification to the policy server that the device has detected the particular traffic or service, wherein the policy server receives the notification from the device that the device has detected the occurrence of said particular network traffic or service, and wherein, in response to receiving said notification, the policy server sends a second message over the network from the policy server to a network component, said second message containing information associated with said notification, said second message instructing the network component to apply a new rule to said particular network traffic or service taking place over the connection, and said second message containing at least one of bandwidth, quality of service (QoS), and charging policy instructions for said network component to implement with respect to said particular network traffic or service for said connection.

12. The system of claim 11, wherein the policy server implements a Policy and Charging Rules Function (PCRF).

13. The system of claim 11, wherein the network component comprises a computer system implementing an application function (AF).

14. The system of claim 11, wherein the second message reports the detected occurrence of said particular traffic or service to the network component.

15. The system of claim 11, wherein the policy server is configured to receive a notification that a particular subscriber has established the connection over the network and wherein the policy server is configured to send the first message over the network from the policy server to the device in response to receiving said notification that said particular subscriber has established the connection over the network.

16. The system of claim 11, wherein the network component logs information received from the policy server via the second message.

* * * * *